Jan. 22, 1963

G. A. THOMPSON 3,074,090

FLOOR SCRAPER

Filed Aug. 11, 1960

INVENTOR.
George A. Thompson
BY
Townsend and Townsend
attorneys

Jan. 22, 1963

G. A. THOMPSON 3,074,090

FLOOR SCRAPER

Filed Aug. 11, 1960

INVENTOR
George A. Thompson

BY
Townsend and Townsend
attorneys

United States Patent Office 3,074,090
Patented Jan. 22, 1963

3,074,090
FLOOR SCRAPER
George A. Thompson, San Francisco, Calif., assignor of one-half to Frederick Meiswinkel, Inc., San Francisco, Calif., a corporation of California
Filed Aug. 11, 1960, Ser. No. 49,054
2 Claims. (Cl. 15—93)

This invention relates to a power driven floor scraper.

During the construction or repair of buildings or exterior structures spilled plaster, cement, mortar or other material frequently is deposited on the floor. After the repair or construction job is finished it is then necessary for the workmen to spend considerable time and effort in cleaning the floor. In many instances the mortar, cement or plaster affixes itself sufficiently to the floor so that the removal job is time consuming and expensive.

A principal object of this invention is to provide a new and unique power driven floor working tool which will scrape floor surfaces to remove unwanted matter adhered to the floor.

Another object of this invention is to provide a scraping device in which the blade is reciprocally moved relative to the floor surface under conditions which change the angle of attack of the blade during its reciprocal motion.

A further object of this invention is to provide a mobile floor working tool carrying a reciprocally movable work tool such as a blade with means for spring urging the work tool against the floor surface.

A feature and advantage of this invention is that the work tool is reciprocally movable by means of an eccentric connection to a flywheel and is guided at its lower portion by a bearing carried upon a spring so that the spring functions to bias the work tool against the floor. The spring may constitute the sole bearing for the work tool or may function to relieve the load against other bearing structures which guide the work tool for reciprocal movement.

Another object of this invention is to provide a device in which a blade is mounted on a portable carriage for reciprocal movement against a floor surface in which bearings guide the blade relative to the carriage.

Another feature and advantage of this invention is that the work tool moving device is operated from a flywheel so that substantially mechanical inertia is imparted to the movement of the work tool thus allowing the work tool to exert full force and effect in engagement with the floor.

A further feature and advantage of this invention is that work tool is mounted within the work tool holder at the bottom of a reciprocally movable arm so that the work tool structure itself may be changed from time to time or sharpened in the case of a blade while removed from the machine itself.

A further feature and advantage of this invention is that the work tool carrying arm for the work tool and its supporting bearing may be separated from engaging contact to allow the work tool to be retracted into an upwardly extending reverse direction so as to render the device more easily movable from location to location when not in use. This feature also allows the floor working tool to be stored in a smaller floor space area.

Another feature and advantage of this invention is that the floor working tool is easily operable from either electrical or gasoline power and may be operated by an unskilled operator without the necessity of prior training or experience.

Other objects of the present invention will become apparent upon reading the following specification and referring to the accompanying drawings in which similar characters of reference represent corresponding parts in each of the several views.

Figure 1:
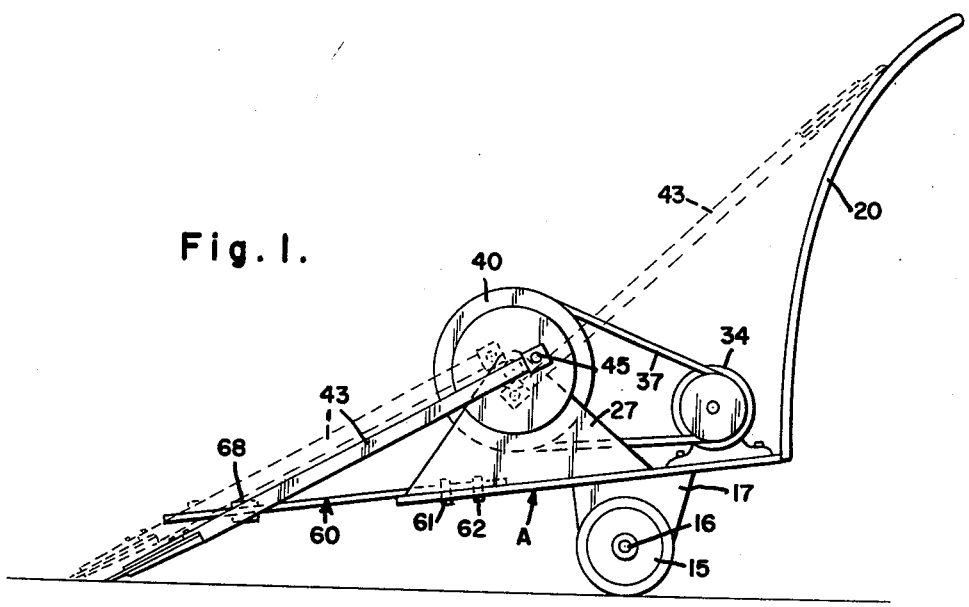
FIG. 1 is a side elevational view showing a principal embodiment of the invention in which the dotted lines indicate the various positions of the work tool carrying arm of the device.

In the principal embodiment of the invention there is provided a carriage generally indicated at A supported by wheels 15. The wheels are rotatably mounted on an axle 16 which is supported from an axle carrying frame 17 depending from the underface of carriage A.

A handle 20 is mounted in the rear of carriage A and extends upwardly therefrom. Handle 20 is formed of a U-shaped tubular member and provides means whereby the carriage may be manually pushed from place to place.

On the upper face 22 of carriage A there is provided a pair of axle support braces 25. Each axle support brace is formed by an L-shaped member in which one leg 26 is mounted to the carriage A and the other leg 27 extends upwardly therefrom in a substantially triangular configuration forming a bearing 30 at the apex. The two braces 25 are spaced apart so that the bearings form a support for axle 32.

A motor 34 is mounted on upper face 22 of carriage A and is arranged to drive a pulley 35 which is in belt driven engagement with the pulley 36 mounted on axle 32 by virtue of belt 37. Motor 34 thus imparts rotary movement to axle 32. Pulley 36 is substantially larger than pulley 35 to provide increased torque.

Two flywheels 40 are mounted on opposite ends of axle 32. A scraper blade or work tool assembly B is connected eccentrically and pivotally to the outer face of flywheels 40.

The scraper blade assembly comprises a frame forming a bifurcated yoke generally indicated at 42 having two spaced apart arms 43. The ends of the arms carry bearings 44 which rotatably engage small shafts 45 extending outwardly from the outer face of the flywheels.

A blade or work tool carrying device C is mounted on the opposite ends of the legs in order to carry a blade or work tool 50 in axial alignment relative to the arms. The blade or work tool is carried between two jaws 51 and 52 which are held together and affixed to the ends of the arms by bolts 53 and 54. Blade 50 can be removed from the jaws by removing bolts 53 and 54 so that the blades may be readily removed and replaced when necessary. The front portion of the blade presents a broad face which is transverse the direction of reciprocal movement of scraper blade assembly B and the bottom edge 55 of which is honed to be substantially parallel with the floor surface.

The entire scraper blade assembly B is spring urged downwardly by a leaf spring 60. Leaf spring 60 is rigidly mounted in the middle forward portion of carriage A by two U-bolts 61 and 62. The opposite end portion 65 of leaf spring 60 is slidably engaged with a bearing 68 carried by a bearing support 69 mounted on the two arms 43 of scraper blade assembly B.

When it is desired to use the device for cleaning a floor, motor 34 is energized to cause flywheels 40 to rotate. The rotation of the flywheels causes scraper blade assembly B to reciprocate due to the eccentric mount of scraper blade assembly B on the flywheel.

The device may be moved around the floor by simply manipulating handle 20 in such a way that blade 50 is forced downwardly against the floor. The spring functions to cause spring tensioning against the floor as the blade is reciprocally moved.

It is also noted that the angle of attack of the blade is varied as the blade is reciprocally moved thus causing the blade to have a more efficient action on dirt and debris which may be adhered to the floor. The sliding contact of spring 60 allows the blade to reciprocate fully under spring tension so that the contact pressure that the blade exerts against the floor remains substantially the same. This is important in that if the pressure gets too great the blade is likely to cut into the floor surface and if the pressure is not great enough the blade will not have the efficient cleaning or scraping action against the floor. The operator has some control of blade pressure by exerting force against handle 20. However, no matter how much force he exerts against handle 20 the spring action of spring 60 will allow a resilient contact of the blade with the floor.

Figure 2:
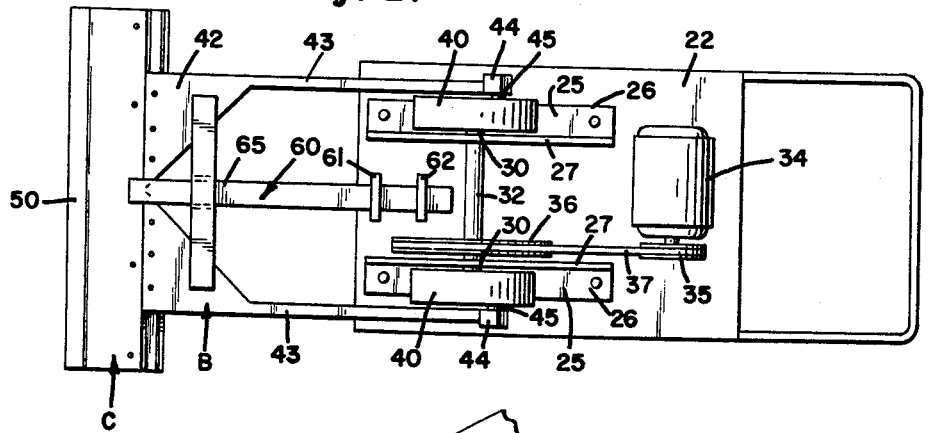
FIG. 2 is a top plan view.

When the device is to be moved from place to place and is in an inoperative condition, U-bolts 61 and 62 can be loosened and leaf spring 60 can be slid rearwardly thus freeing scraper blade assembly B so that it can be rotated upwardly to a rearwardly extending position with the end of the blade resting against the top portion of handle 20 as shown in FIG. 2. This means the device may be moved about or stored in a minimum floor space area.

It is also noted that the rear edge of axle carrying frame 17 which supports the wheels for the device are formed with an edge which is substantially coincident with the rearward extremity of the wheel to facilitate the easy lifting of the device up stairs and the like.

Although mntor 34 is shown to be an electrical motor it is obvious that the motor may be a gasoline motor as well.

The motor also may be mounted directly to the axle or may be mounted in the forward position relative to the axle.

It is also important to note that the specific position of bearing 68 may be controlled by changing the position of bearing support 69.

Figure 3:
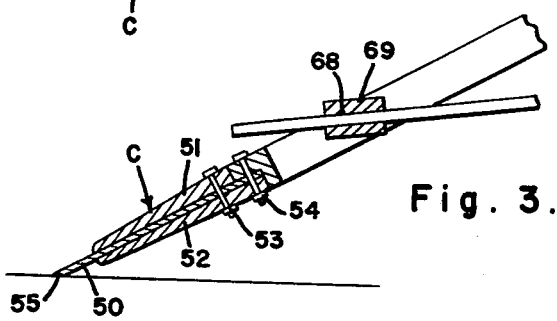
FIG. 3 is an enlarged fragmentary cross-sectional view of the work tool, the work tool mounting device and the arm supporting the bearing.
Figure 4:
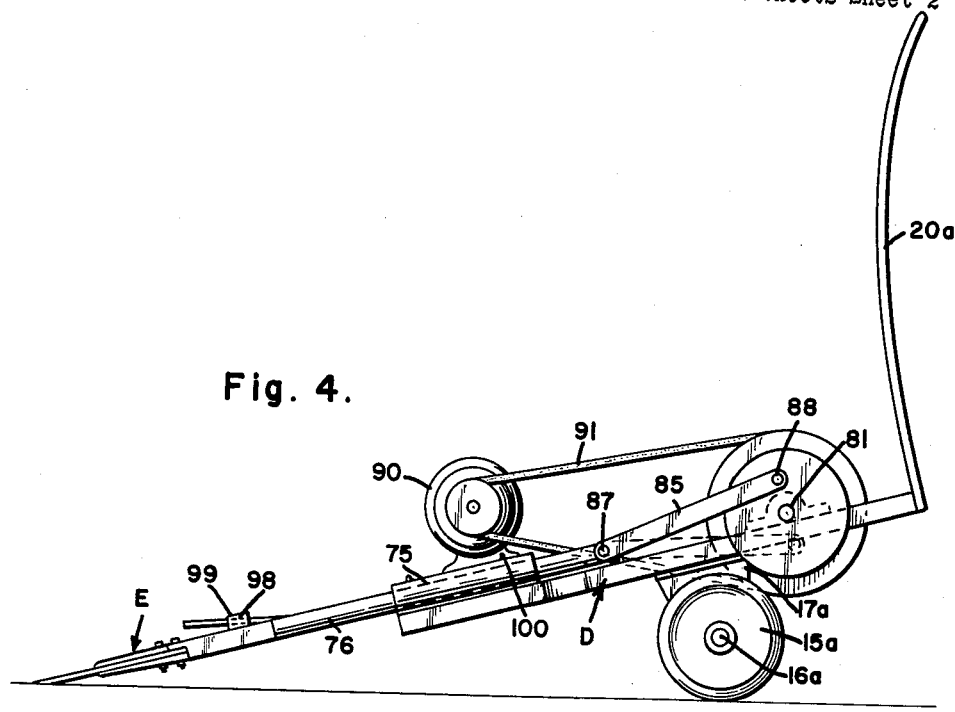
FIG. 4 is a side elevational view showing another embodiment of the invention.
Figure 5:
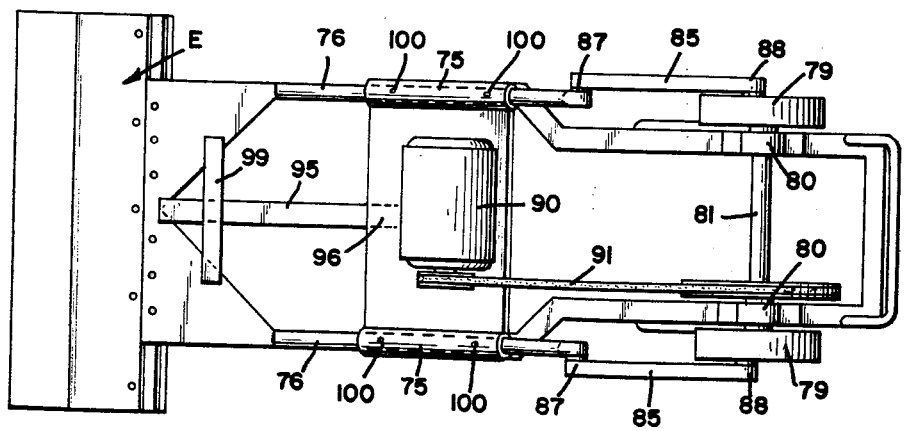
FIG. 5 is a top plan view of the embodiment of FIG. 4.

Referring to FIGS. 4 and 5, there is provided another embodiment of the invention. The embodiment of FIGS. 4 and 5 comprises a carriage D mounted for mobile movement on wheels 15–a which are carried by an axle-carrying frame 17–a and mounted on an axle 16–a in exactly the same manner as the embodiment in FIGS. 1, 2 and 3. The device is also provided with a handle 20–a which is identical to handle 20 in the proper embodiment.

A pair of cylindrical bearings 75 are mounted on carriage D in spaced apart, parallel relationship. Bearings 75 are arranged to carry and guide two tubular blade-carrying arms 76. The upper extremities of the arms carry a work tool carrying device E identical in its structure to the blade-carrying device B of FIGS. 1, 2 and 3. Arms 76 are reciprocally moved by flywheels 79 mounted on the rear portion of carriage D by bearing supports 80 which carry the axle 81 for the flywheels. The arms 76 are connected to the flywheel by means of a link arm 85 pivotably connected to arms 76 as at 87 and eccentrically mounted to the flywheel as at 88. The axle 81 is mounted in the plane of movement of arms 76 through bearing 75 so that the rotational axis of flywheel 79 is in axial alignment with bearings 75.

The flywheels 79 are rotated by a motor 90. The motor is interconnected in driving relationship with the flywheels by a belt and pulley mechanism indicated at 91.

In operation, motor 90 is energized and the device is operated in the manner as indicated in the description of the embodiment of FIGS. 1, 2 and 3, wherein the blade is arranged to engage the floor surface and acts to scrape the surface by virtue of the reciprocal motion imparted to the blade through the reciprocal movement of arms 76. It can be seen in this device that as handle 20–a is pushed forward, the carriage D will pivot downwardly to cause the blade-carrying device E to be forced against the floor surface. This, however, may cause a strain on bearings 75, which would cause undue wear on the bearings and an increased load on the arm-driving mechanism.

To counteract this force, a spring is mounted on the forward end of carriage D midway between the two arms 76 as at 96. The forward end of spring 95 engages a bearing 98 carried by a bearing support arm 99 mounted on the blade-carrying device E. The spring is biased to force the forward end of the blade-carrying device E downwardly and functions in operation to relieve the load against the bearings 75. The bearings 75 may be lubricated by oil fittings 100.

While the device is intended primarily for scraping floors to remove debris and the like that may be adhered to the floor it is believed obvious that other attachments may be mounted on the forward end of the blade mounting jaws to accomplish other purposes. For example a cleaning head, sanding tool or polishing tool could conveniently be mounted in place of the blade.

Although the foregoing invention has been described in some detail by way of illustration and example for purposes of clarity of understanding, it is to be understood that certain changes and modifications may be practiced within the spirit of the invention as limited only by the scope of the appended claims.

What is claimed:

1. A floor working tool of the type having a mobile carriage, a pair of arms extending forwardly from said carriage, power means mounted on said carriage for reciprocating said arms, and a work blade mounted on the end of said arms the improvement comprising a pair of wheels supporting said carriage, said wheels being pivotally mounted to said carriage approximate the center of gravity of said carriage, and handle means mounted at the rear end of said carriage whereby said carriage can be pivoted about said wheels at selected elevations to manually control the pressure of said blade against a work surface.

2. A device according to claim 1 and having spring means fixedly mounted on said carriage and extending forwardly thereof between said arms, bearing means fixedly mounted between said arms and slidably engaged with said spring means whereby said spring means forcefully biases said arms in the forward position with the forward downward movement of said carriage.

References Cited in the file of this patent

UNITED STATES PATENTS

| | | |
|---|---|---|
| 2,498,205 | Goldenberg | Feb. 21, 1950 |
| 2,519,138 | Katz | Aug. 15, 1950 |
| 2,774,586 | Becker | Dec. 18, 1956 |